Dec. 1, 1942.  D. CARTER ET AL  2,303,985
FARE BOX
Filed June 18, 1941  2 Sheets-Sheet 1
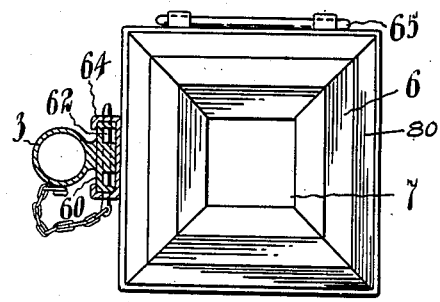
Fig. 2.
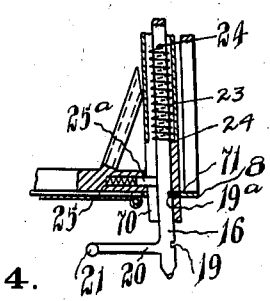
Fig. 4.
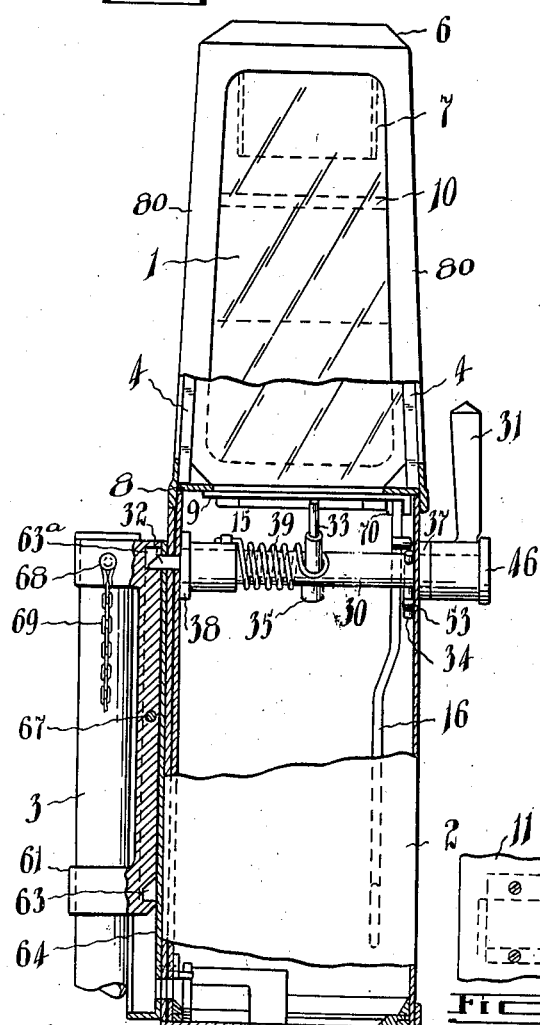
Fig. 1.
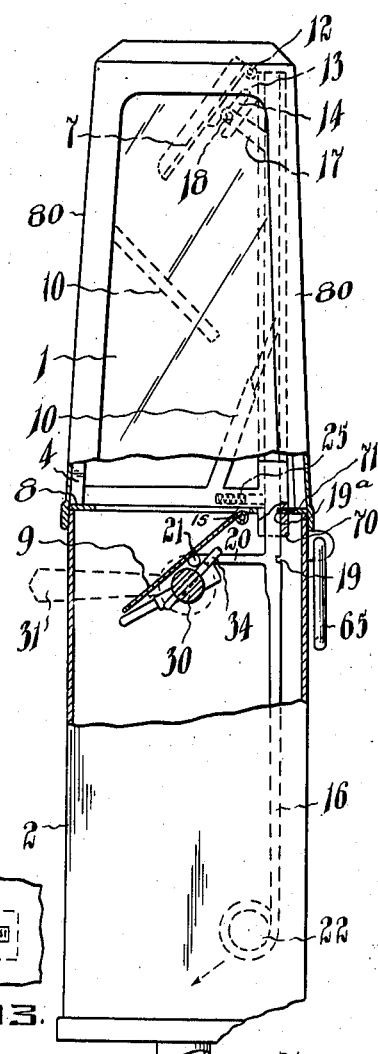
Fig. 13.
Fig. 3.
Inventors
Daniel Carter
Baden Powell Carter
by *Harold Tickle*
Attorney Dec. 1, 1942.  D. CARTER ET AL  2,303,985
FARE BOX
Filed June 18, 1941   2 Sheets-Sheet 2
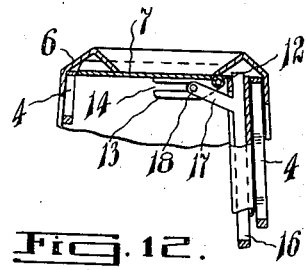
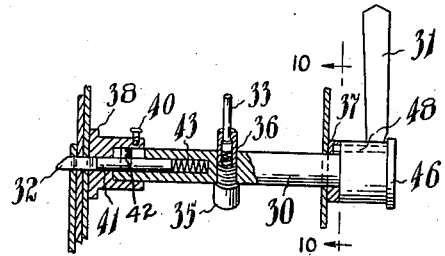
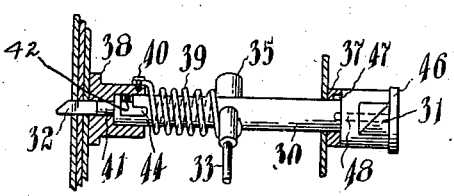
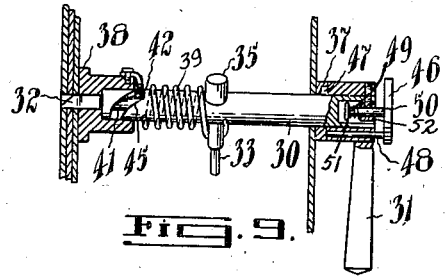
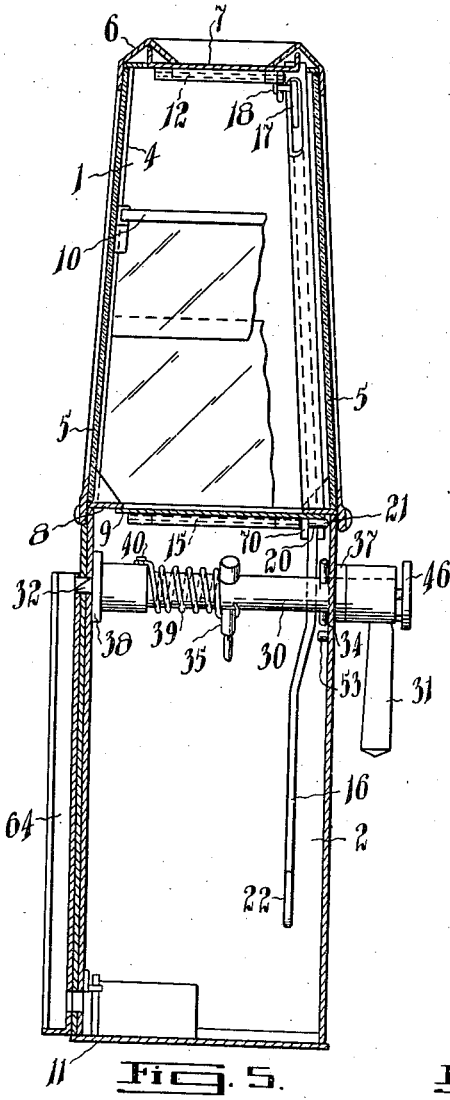
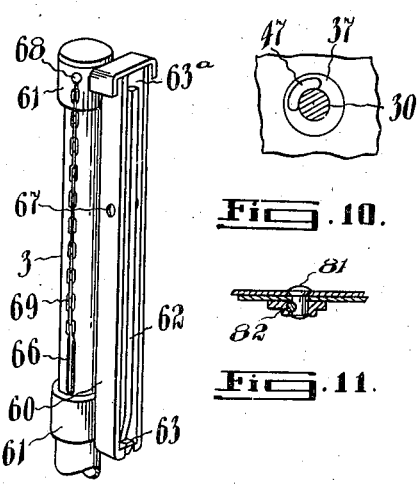
Inventors
Daniel Carter
Baden Powell Carter
by
Attorney

Patented Dec. 1, 1942

2,303,985

UNITED STATES PATENT OFFICE 2,303,985

FARE BOX

Daniel Carter and Baden Powell Carter, Toronto, Ontario, Canada; said Daniel Carter assignor to said Baden Powell Carter Application June 18, 1941, Serial No. 398,516

8 Claims. (Cl. 232—12)

The present invention relates to fare boxes of the type commonly used on street cars and busses and is particularly directed towards incorporating improvements which substantially reduce the cost of manufacture and maintenance.

Fare boxes of the type used on street cars and busses are well known and, in general, include two compartments, an upper or fare receiving compartment into which the fare is deposited by the passenger, and a lower or fare containing compartment into which the fares are dropped by the operator and in which the fares accumulate until they are removed by an authorized collector. The fare box is usually detachably mounted on a standard or fixed post, in which position it is locked in fare receiving position.

One of the principal difficulties in existing fare boxes is that of the relatively complicated arrangement of parts which has been devised to prevent the undetectable removal of the fares by unauthorized persons. This complicated mechanism has resulted in a relatively high cost of manufacture and a relatively high maintenance cost when in use.

One of the principal objects of the present invention is to provide a fare box which is simple in construction and which has relatively few working parts.

A further object of the invention is to provide a fare box where undetectable tampering by unauthorized persons to gain access to the contents of the box is substantially prevented.

One of the principal features of the invention resides in the manner in which the fare box is locked to the standard or fixed post, from which position it cannot be removed without locking the several compartments of the box thereby preventing the removal of the fares therefrom.

A further principal feature of the invention resides in the several locking assemblies which are very inexpensive in their construction, easily operated and are positive and instantaneous in their action.

Further features reside in the various detailed improvements which have been incorporated in the fare box to decrease the cost of manufacture and to eliminate all possible sources of undetectable tampering with the box to gain access to the contents thereof.

In order that the objects and features of the invention may be completely understood, reference is made to the following description and accompanying drawings, in which:

Figure 1 is a front elevation, partly in cross section, of a fare box, incorporating our improvements, in fare receiving position;

Figure 2 is a top plan view;

Figure 3 is a side elevation partly in cross section showing the hinged inspection table in open position;

Figure 4 is a cross-sectional detail of the mechanism controlling the opening and closing of the shutter and the table;

Figure 5 is a cross-sectional front elevation of the fare box showing the fare receiving and fare containing compartments in locked positions and the bolt in retracted position;

Figure 6 is a side elevation, slightly in perspective, of the standard on which the fare box is mounted;

Figure 7 is a cross-sectional detail view of the fare box mechanism locked to the standard in fare receiving position, as illustrated in Figure 1;

Figure 8 is a cross-sectional detail of the same parts rotated through 90° to release the table as shown in Figure 3;

Figure 9 is a cross-sectional view of the same parts rotated through 180° to close the fare receiving compartment and retract the bolt as shown in Figure 5;

Figure 10 is an end view taken along the line 10—10, Figure 7;

Figure 11 is a cross-sectional side detail of the arrangement by means of which the upper part of the fare box is secured to the base position;

Figure 12 is a cross-sectional side elevation of the upper part of the receiving compartment in locked position as shown in Figure 5; and Figure 13 is a plan view of the door leading into the fare containing compartment, partly broken away to show the register.

Like reference characters refer to like parts throughout the specification and drawings.

In general, the present fare box includes the upper or fare receiving compartment 1, the lower or fare containing compartment 2, and the standard or fixed post 3 on which the fare box is detachably mounted in fare receiving position.

The upper or fare receiving compartment 1 comprises a substantially rectangular frame formed of four upright angle members 80 within which the inside frame is received. The angle members 80 carry, at their uppermost ends, the top plate 6 which is formed with a fare receiving opening. A shutter 7 is hingedly mounted in the top plate 6 and extends, in horizontal position, across the fare receiving opening, thus effectively closing that opening.

The inside frame is the same shape as the outside frame and is formed with four upright corner members 4 which with members 80 act as a groove to receive the glass wall panels 5. The angle members 80 of the outside frame and top plate 6 can be made in separate pieces but for the purpose of cheapness and appearance, we prefer to stamp them in one piece out of metal such as an alloy steel which will retain its polished appearance.

In its open position, the shutter 7 is angularly disposed to provide a short downwardly extending baffle for the fare dropped through the fare receiving opening, and in its closed position extends horizontally across the top plate 6 to close the opening.

Several downwardly extending angularly disposed baffles 10 are also secured to the corner members 4 for the purpose of directing the fare on to table 9.

The lower ends of the corner members 4 are carried on the bottom plate 8 which is formed with a relatively large opening directly below the lowermost baffle 10. The opening is closable by means of the hingedly mounted table 9.

The fare containing compartment 2 is preferably formed of sheet metal and is also preferably rectangular in form. The open upper end provides a seat for the bottom plate 8, in which seat the fare receiving compartment may be removably secured. For the purpose of safeguarding the contents of the fare containing compartment, we prefer to secure the two compartments together by an arrangement such as illustrated in Figure 11. This arrangement includes four horizontally disposed stud screws 81 which pass through the walls of the lower compartment and the base of the fare receiving compartment. One or more vertically disposed locking screws 82 extend vertically through the housings in which stud screws 81 are received. Each stud screw 81 is grooved about midway of its length, into which groove the periphery of locking screw 82 is received in locking engagement. Thus, stud screws 81 can only be removed after locking screws 82 have been removed, which removal can only be effected from inside the lower compartment 2.

The lower end of the compartment 2 may be closed by a door 11 which may be locked in place, thereby preventing unauthorized access to the contents of the compartment.

The fixed post or standard 3 is usually permanently mounted on the floor of the street car, extending vertically upwardly therefrom.

The arrangement of parts by means of which the fare box is detachably mounted on the standard 3, and the various cooperating parts, by means of which the fare box is held in fare receiving and in locked positions, are described in detail hereinafter.

The shutter 7 is hingedly secured to the top plate 6 by means of the pin 12 which passes through aligned hinge members provided in the ends or sides of the shutter 7 and the top plate 6. A bifurcated lug 13 projects from the underside of the shutter 7 extending from approximately the pin 12 midway of the surface of the shutter. The lug 13 is formed with an elongated V-shaped slot 14 which is parallel to the shutter and preferably formed with rounded ends.

The table 9 is hingedly secured to the bottom plate 8 by means of the pin 15 which passes through aligned hinge members provided in the ends or sides of the table and the bottom plate 8.

The shutter 7 and table 9 are operably connected to the rod 16.

The rod 16 extends from a point immediately below the top plate 6 downwardly through the fare box to a point above the bottom door 11, passing through an orifice in the bottom plate 8. A housing 70 is provided to guide the rod where it passes through the bottom plate 8. The rod 16 preferably passes downwardly through the fare box adjacent to one of the corner members 4.

An arm 17 extends outwardly from the upper end of the rod 16 towards the shutter 7 and carries, on its outer end, a pin 18 which fits snugly and is movable in the slot 14.

Approximate to the point where the rod 16 passes through the bottom plate 8, two spaced apart notches 19—19a are formed. Each notch 19—19a is adapted to fit into an edge 71 of the bottom plate 8 which projects into the housing 70 and is provided to engage the notches. The notch 19 is located to engage the edge 71 when the table 9 is in closed position and the notch 19a is located to engage the edge 71 when the table is in manually openable position.

The arm 20 extends horizontally outwardly from the rod 16 and is located immediately below the table 9 in a position such that when the notch 19 fits into the edge 71, the arm 20 presses against the underside of the table 9, thereby holding the table firmly in closed position. The end of the arm 20 is preferably rounded and provides a housing for the pin 21 which extends at right angles therefrom.

The lower end of the rod 16 is preferably turned into a ring 22 to provide a gripping handle.

A vertically disposed compression spring 23 is mounted on the rod 16 and is interposed between the spaced apart stop members 24 located above the bottom plate 8. A horizontally disposed compression spring 25 is mounted in the bottom plate 8 approximate to the rod 16 and bears against pin 25a which, in turn, presses against rod 16 to hold the notches 19 and 19a in respective engagement with the edge 71 in the bottom plate 8.

The arrangement of parts by means of which the fare box is locked in or released from its various positions are illustrated in detail in Figures 7, 8 and 9, in addition to the general assembly as illustrated in Figures 1, 3 and 5. The arrangement of parts include, in general, the transverse rotatable member 30, the handle 31, the bolt 32, the table supporting arm 33 and the releasing arm 34, together with cooperating and actuating parts, as will be explained in detail hereinafter.

The rotatable transverse member 30 is journalled in the housings 37—38 provided on the sides of the upper portion of the fare containing compartment 2. One end of the rotatable member extends exteriorly of the compartment and carries the operating handle 31.

A releasing arm 34 extends at right angles through the member 30 approximate to the side of the compartment 2 adjacent to the handle and normally rests against a stop member 53 which is in the form of a lug projecting from the wall of the compartment. The arm 34 is of a length sufficient to contact pin 21 when rod 16 is in position such that notch 19a engages edge 71 of the bottom plate 8.

The bushing 35 extends at right angles through the member 30, approximately midway between the sides of the compartment 2. The table supporting arm 33 is carried in and extends from the bushing 35. A light compression spring 36 is provided in the bushing 35 and is mounted on the table supporting arm 33.

A spring 39 is mounted on the member 30, extending between the housing 38 and the bushing 35, one end of the spring being secured to pin 40 provided on the housing 38 and the other end to the bushing 35. The arm 33 is of sufficient length to press lightly against table 9 when the arm is in its normally upright position.

The bolt 32 extends exteriorly of the side of the compartment opposite to the handle 31 and is formed with a shank 41 which is journalled in a sleeve centrally located in the end of the member 30. A pin 42 projects from the shank 41 approximate to the end thereof remote from the bolt.

A compression spring 43 is mounted in the sleeve between the rearward end thereof and the rearward end of the shank 41.

The grooves 44—45 are cut in the walls of the sleeve, extending towards the handle end thereof, and are adapted to receive the projecting pin 42. The groove 44 extends substantially parallel to the rotatable member 30 a distance sufficient to permit retraction of the bolt 32 while the groove 45 extends at right angles for approximately 90° to allow table 9 to open and thence towards the handle at an angle of approximately 45°.

The pin 42, in the normal protracted position of the bolt 32, is located at the entrance to each of the grooves 44—45.

The handle 31 is mounted on the outer end of the rotatable member 30 between the housing 37 and the circular clutch-like member 46. The clutch member 46 includes a shank 50 which is journalled in a housing 52 carried in a sleeve formed in the end of the rotatable member 30.

The outside face of the housing 37 is formed with a groove 47 which extends through an arc of approximately 90°. The groove 47 is adapted to receive the pin 48 which extends from the member 46.

The pin 48 is normally held in groove 47 by means of a compression spring 49 which is mounted on the shaft 50 between the stop member 51 and the housing 52.

An elongated rectangular open front frame 64 is secured to the side of the compartment 2, the top of the frame being approximate to the bolt 32 which projects therethrough into the interior of the frame. The outside edges of the sides of the frame 64 are turned inwardly to form a retaining groove as illustrated in Figure 2. The frame 64 is formed with a lower end wall while the upper end is open.

The standard 3 on which the fare box is mounted includes an open front frame 60 which may form a part of the post or may be secured thereto by means of the brackets 61. A slide member 62 extends between the walls of the frame 60 and is formed with two bolt receiving notches 63—63ᵃ, one approximate to the bottom of the slide member and the other approximate to the top.

The frame 60 is adapted to be received within the groove formed by the frame 64 secured to the compartment 2.

The lockable door 11 at the base of the containing compartment 2 is provided preferably with a key opening in the wall of the compartment 2 extending into the frame 64. The lock on the door 11 is also preferably provided with a register, as illustrated in Figure 13 which indicates the number of times the lock has been unlocked.

The fare box is further provided with a hinged handle 65 for convenience in carrying and for attaching it to and detaching it from the fixed post.

The fare box is mounted on the fixed post by engaging the lower end of the frame 60 within the open end of the groove formed by the frame 64 and then sliding the box upwardly on the frame 60 with the bolt moving on the sliding member 62. The bolt 32 is first received within the notch 63 and, therefore, the fare box cannot be detached from the post without first locking the table 9 and shutter 7 in their closed position, as will be explained in detail hereinafter.

The box is raised upwardly until the bolt 32 is received within the notch 63ᵃ in which position the holes 67, which are provided in frames 60 and 64, are in alignment and the pin 66 may be passed therethrough to relieve the strain of the weight of the fare box from the bolt 32. The pin 66 is carried on chain 69 which is secured to the standard 3 by means of the pin 69.

In this position, as illustrated in Figures 1, 2, 3, 4, 7 and 8, the fare box is in its fare receiving position, that is, the shutter 7 is open and the table 9 is supported by the table supporting arm 33. The spring 36 urges the table supporting arm 33 upwardly to press lightly against the underside of the table 9. This support may be removed by turning the handle 31 through 90° which permits the table 9 to swing downwardly on its hinge, thus dropping the fares collected thereon into the lower fare containing compartment, as illustrated in Figure 8.

The handle 31 is prevented from moving through more than 90° due to the action of pin 48 which can move only that distance in groove 47. The end of the groove 47 acts as a downward stop member which prevents further rotation of member 30. The extent of this movement is illustrated in Figures 7, 8 and 10. The rotatable member 30 is returned to its normal position by the action of spring 39, the extent of the return movement being limited by releasing arm 34 contacting stop member 53.

In order to detach the fare box from the standard 3, it is necessary first to remove the pin 66. The fare box is then supported on the standard only by bolt 32. In order to turn member 30 sufficiently to retract bolt 32 and thus permit the box to be detached from the post, the pin 48 is withdrawn from groove 47 by pulling the clutch member 46 outwardly which permits the handle 31 to be turned through 180°. During the turning of the handle, the releasing arm 34 contacts the pin 21, thereby releasing the engagement of notch 19ᵃ with the edge 71 in bottom plate 8, which permits the compression spring 23 to draw rod 16 upwardly until notch 19 engages the edge 71, thus bringing arm 20 into firm contact with the underside of table 9, thereby holding the table firmly in closed position. It is only possible for releasing arm 34 to pass below pin 21 when the table 9 is locked in closed position. At the same time, arm 17, through the action of pin 18 moving in slot 14, closes the shutter 7 and holds it firmly in locked position.

When releasing arm 34 has passed below pin 21, bolt 32 is retracted through the action of pin 42 which engages in groove 45. With the bolt in retracted position, the fare box can be detached from the post. It will be understood, of course, that the action of the respective movements is simultaneous until the table 9 and shutter 7 are locked in closed position. Only then is the bolt 32 retractable by continuing the rotation of member 30 through 180°.

Access to the interior of the containing compartment 2, when the table 9 and shutter 7 are in closed position, can only be gained by removing door 11. As pointed out hereinbefore, it is preferred to have the key opening in such position that access to it can only be gained when the box is detached from the standard. When the door 11 is opened, the collected fares can be removed and the rod 16 pulled downwardly until notch 19ª engages the edge 71 of the bottom plate 8, in which position the fare box can be again attached to the standard 3 and is again in fare receiving position.

We have found that the simplicity of the various moving parts in our fare box decreases the cost of manufacturing the box and, further, practically eliminates maintenance costs in view of the small number of working parts. In addition, of course, the incorporation of the various safety devices substantially prevents undetectable tampering with the fare box to gain access to the contents.

It will be understood that modifications of the specific embodiment of our invention described and illustrated herein may become apparent to those skilled in the art in the light of the present teachings without departing from the scope thereof as defined in the appended claims.

What we claim as new and desire to protect by Letters Patent of the United States is:

1. In a fare box, an upper fare receiving compartment and a lower fare containing compartment in communication therewith, a fare receiving opening in the upper part of said fare receiving compartment and shutter means for closing said opening, a hingedly mounted fare inspection table normally interposed between said compartments, means for detachably locking said fare box on a fixed standard including a transverse shaft member rotatably journalled in opposite walls of said fare containing compartment, said shaft having a retractable bolt member journalled in one end thereof and normally extending exteriorly of its adjacent wall and an operating handle carried by the opposite end exteriorly of its adjacent wall, means carried by said rotatable member for normally supporting said inspection table in a horizontal position, and means for rotating said shaft member a predetermined limited distance without retracting said bolt member, thereby releasing said inspection table supporting member, means on said shaft for releasing said rotation limiting means, means progressively coacting with the rotation of said shaft at predetermined positions past said predetermined limited distance whereby in the first stage the shutter and the hinged inspection table are locked in closed position and in the second stage and on further rotation of the shaft the bolt member is retracted.

2. In a fare box, an upper fare receiving compartment and a lower face containing compartment in communication therewith, a fare receiving opening in the upper part of said fare receiving compartment and shutter means for closing said opening, a hingedly mounted fare inspection table normally interposed between said compartments, means for detachably locking said fare box on a fixed standard including a transverse shaft member rotatably journalled in opposite walls of said fare containing compartment, said shaft having a retractable bolt member journalled in one end thereof and normally extending exteriorly of its adjacent wall and an operating handle carried by the opposite end exteriorly of its adjacent wall, means carried by said rotatable member for normally supporting said inspection table in a horizontal position, and means for rotating said rotatable member a predetermined limited distance without retracting said bolt member, thereby releasing said inspection table supporting means, means on said shaft for releasing said rotation limiting means, means progressively coacting with the rotation of said shaft at predetermined positions past said predetermined limited distance whereby in the first stage the shutter and the hinged inspection table are locked in closed position and in the second stage and on further rotation of the shaft the bolt member is retracted, and means on said shaft preventing the aforesaid further rotation thereof until the shutter and the hinged inspection table are locked in closed position.

3. In a fare box, the combination of a fare receiving and a fare containing compartment, a groove-like frame extending longitudinally of said fare containing compartment, and a fixed upright standard having a tongue-like frame receivable in said groove-like frame, a bolt receiving notch at the entrance to said tongue-like frame, and a second bolt receiving notch at the point where the fare box is normally held in fare receiving position.

4. In a fare box, an upper fare receiving compartment and a lower fare containing compartment in communication therewith, a fare receiving opening in the upper part of said fare receiving compartment, and shutter means for closing said opening, a hingedly mounted fare inspection table normally interposed between said compartments, means for detachably locking said fare box on a fixed standard including a transverse shaft rotatably journalled in opposite walls of said fare containing compartment, said shaft including an operating handle mounted on one end thereof exteriorly of said compartment, and a retractable bolt member journalled in the opposite end of said shaft and extending exteriorly of said compartment, said shaft including a spring urged inspection table supporting arm normally in contact with the underside of said table, and means for rotating said shaft a predetermined limited distance without retracting said bolt member, and means for releasing said rotation limiting means, and means progressively coacting with the rotation of said shaft at predetermined positions past said predetermined limited distance whereby in the first stage the shutter and the hinged inspection table are locked in closed position and in the second stage and on further rotation of the shaft the bolt member is retracted, and including means on said shaft for preventing the aforesaid further rotation thereof until the shutter and the hinged inspection table are locked in closed position.

5. In a fare box, an upper fare receiving compartment and a lower fare containing compartment in communication therewith, a fare receiving opening in the upper part of said fare receiving compartment and shutter means for closing said opening, a hingedly mounted fare inspection table normally interposed between said compartments, a spring actuated rod operatively connected to said shutter and said fare inspection table, and means for detachably locking said fare box on a fixed standard including a transverse shaft rotatably journalled in opposite walls of said fare containing compartment, said shaft including an operating handle mounted on one end of said shaft exteriorly of said compartment and a retractable bolt member journalled in the opposite end of said shaft and extending exteriorly of said compartment, said shaft including a spring urged table supporting arm normally in contact with the underside of said inspection table, and means for rotating said shaft a predetermined limited distance without retracting said bolt member, and means for releasing said rotation limiting means, and means progressively coacting with the rotation of said shaft at predetermined positions past said predetermined limited distance including means engaging and releasing said spring actuated rod thereby locking the shutter and the hinged inspection table in closed position, and including means for preventing further rotation of the shaft until the shutter and the hinged inspection table are locked in closed position, and means for retracting the bolt member on further rotation of the shaft.

6. In a fare box, an upper fare receiving compartment and a lower fare containing compartment in communication therewith, a fare receiving opening in the upper part of said fare receiving compartment, and shutter means for closing said opening, a hingedly mounted fare inspection table normally interposed between said compartments, means for attaching said fare box to a fixed standard including a groove-like elongated frame on an outside wall of said fare containing compartment, a retractable bolt journalled in one end of a transverse shaft rotatably journalled in opposite walls of the fare containing compartment and extending exteriorly of said compartment and into said groove-like frame, an elongated tongue-like frame carried by said standard adapted to be received within the groove-like frame, a bolt receiving notch in the tongue-like frame at the point where the tongue-like frame is first received within the groove-like frame, and a second bolt receiving notch located at the point where the fare box is held in normal fare receiving position, and an operating handle carried by said transverse shaft in the end remote from said bolt and exteriorly of said compartment, and means for rotating said shaft a predetermined distance without retracting said bolt, and means cooperating with said shaft for releasing said rotation limiting means, means progressively coacting with the rotation of said shaft at predetermined positions past said predetermined limited distance whereby in the first stage the shutter and the hinged inspection table are locked in closed position and in the second stage on further rotation of the shaft the bolt member is retracted, and means preventing the aforesaid further rotation of said shaft until the shutter and inspection table are locked in closed position.

7. In a fare box having an upper fare receiving and lower fare containing compartment, a shutter closable fare receiving opening in the upper part of the fare receiving compartment and a hingedly mounted inspection table interposed between the compartments, a spring actuated rod operably connected to said shutter and said inspection table, a transverse shaft rotatably journalled in opposite walls of said lower compartment, said transverse shaft including a retractable bolt member extending exteriorly of said compartment and an operating handle, and a spring urged arm normally supporting said inspection table, clutch means permitting rotation of said shaft through a limited distance without retracting said bolt member, means for releasing said clutch for rotation of said shaft past said limited distance whereby within the limited rotation of said shaft the supporting arm is removed from contact with the inspection table, and including means on rotation of said shaft past limited distance for releasing said spring actuated rod means and on further rotation of said shaft, for retracting said bolt, said means including means preventing the rotation of the shaft reaching its bolt retracting position until the shutter and inspection table are locked in closed position.

8. In a fare box, the combination of a fare receiving and a fare containing compartment, a groove-like frame extending longitudinally of said fare containing compartment, a lockable door in the base of said fare containing compartment, and a key opening for the door lock in the lower part of said groove-like frame.

DANIEL CARTER.
BADEN POWELL CARTER.